US011004003B2

(12) United States Patent
Sultana (10) Patent No.: US 11,004,003 B2
(45) Date of Patent: May 11, 2021

(54) MACHINE LEARNING BASED EXPLOIT DETECTION

(71) Applicant: Intel Corporation, Santa Clara, CA (US)

(72) Inventor: Salmin Sultana, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 15/623,173

(22) Filed: Jun. 14, 2017

(65) Prior Publication Data
US 2018/0365573 A1    Dec. 20, 2018

(51) Int. Cl.
*G06N 5/04* (2006.01)
*G06F 17/11* (2006.01)
*G06N 20/00* (2019.01)
*G06N 3/04* (2006.01)
*G06F 21/55* (2013.01)
*G06N 5/00* (2006.01)

(52) U.S. Cl.
CPC .............. *G06N 5/04* (2013.01); *G06F 17/11* (2013.01); *G06F 21/552* (2013.01); *G06N 3/0445* (2013.01); *G06N 5/003* (2013.01); *G06N 20/00* (2019.01)

(58) Field of Classification Search
CPC ........ G06N 5/04; G06N 20/00; G06N 3/0445; G06N 5/003; G06F 17/11; G06F 21/552
See application file for complete search history.

(56) References Cited

U.S. PATENT DOCUMENTS

| 7,072,876 B1 * | 7/2006 | Michael | G06F 21/552 |
| | | | 706/45 |
| 2018/0095764 A1 * | 4/2018 | Sultana | G06F 9/30061 |

OTHER PUBLICATIONS

Elsabagh et al., "Detecting ROP with Statistical Learning of Program Characteristics", Mar. 2017, CODASPY '17: Proceedings of the Seventh ACM on Conference on Data and Application Security and Privacy, pp. 219-226 (Year: 2017).*
Roemer et al., "Return-Oriented Programming: Systems, Languages, and Applications", Mar. 2012, ACM Transactions on Information and System Security, vol. 15, No. 1, Article 2, all pages (Year: 2012).*
"Ropper—rop gadget finder and binary information tool", [Online]. Retrieved from the Internet: <URL: https://scoding.de/ropper/>, (Accessed Jan. 24, 2020), 9 pgs.
Le Dinh, Long, "ROPEME—ROP Exploit Made Easy", Blackhat USA, [Online]. Retrieved from the Internet: <URL: https://github.com/packz/ropeme>, (2010), 2 pgs.
Quynh, Nguyen Anh, "OptiROP: the art of hunting ROP gadgets", Blackhat USA, [Online]. Retrieved from the Internet: <URL: https://mediablackhat.com/us-13/US-13-Quynh-OptiROP-Hunting-for-ROP-Gadgets-in-Style-WP.pdf>, (2013), 8 pgs.

(Continued)

*Primary Examiner* — Daniel C Puentes
(74) *Attorney, Agent, or Firm* — Schwegman Lundberg & Woessner, P.A.

(57) ABSTRACT

Described herein are techniques for dealing with the problem of security vulnerabilities in computer software due to undefined behavior that may be exploited by attackers. A machine learning (ML) model is used for detecting an exploit execution within a given trace of application execution. In a specific embodiment, the ML model identifies whether there is any gadget or gadget-chain execution at branch points of a subject program.

20 Claims, 6 Drawing Sheets

(56) References Cited

OTHER PUBLICATIONS

Salwan, Jonathan, "ROPgadget—Gadgets finder and auto-roper", [Online]. Retrieved from the Internet: <URL: https://github.com/JonathanSalwan/ROPgadget/tree/master>, Accessed Nov. 24, 2020), 1 pg.

* cited by examiner

MACHINE LEARNING BASED EXPLOIT DETECTION

BACKGROUND

Undefined behavior of computer software may be exploited by attackers to execute arbitrary code, gain privileges, and commit other acts. An example of this is return-oriented programming (ROP), where an attacker uses a bug in the software to cause buffer overflows of data. The attacker then constructs a number of "gadgets" from existing code whose addresses are chained together on the stack. When a return instruction is repeatedly called, the gadgets are executed. The present disclosure relates to techniques for dealing with this problem.

DETAILED DESCRIPTION

Computer security exploits generally involve an attacker taking advantage of a bug in a computer system's software that allows the attacker to write a malicious payload to the computer system's memory. For example, if a function (e.g., a subroutine of a computer program) does not perform proper bounds checking before storing user-provided data into memory, the function will accept more input data than it can store properly. This results in an overflow of the buffer accepting the input data and in memory being overwritten with the user's input data. In the case where the overflowed buffer is the system stack, the attacker is able to overwrite the return address stored on the stack (which points to the address of the caller of the function) with a new return address pointing to the attacker's desired location. In this way, the attacker is able to hijack the control flow of the computer system's software. In a code-injection type of attack, the malicious code or payload is written onto the stack and the return address is made to point to the location of the newly written code. Code-injection type attacks have been successfully defended against by the implementation of mechanisms for marking locations in memory that are able to be written to as non-executable, termed data execution prevention (DEP).

In order to circumvent DEP defenses, code-reuse attacks were developed in which the attacker, rather than injecting malicious code onto the stack, uses instructions that are already present in executable memory, referred to as a "gadget." The attacker chains the gadgets to perform a desired sequence of operations. Code-reuse attack techniques include return oriented programming (ROP), jump oriented programming (JOP), call oriented programming (COP), counterfeit object-oriented programming (COOP), and data oriented programming (DOP). In an ROP type of attack, the attacker chains gadgets together by manipulating return addresses on the stack to form a sequence of operations. Each gadget ends in a return instruction where the return address points to the next gadget in the sequence. JOP is a variant of ROP that uses indirect jumps rather than return instructions to chain the gadgets together. COP refers to ROP-derived techniques that employ indirect calls to form the chain of gadgets. COOP is a code-reuse type of attack that targets programs written in an object-oriented language such as C++. ROP, JOP, COP, and COOP attacks all result in a disruption of the normal control flow of the program being executed by the attacked computer system, and defenses have been developed that try to ensure that the control flow remains legitimate. During program execution, memory can be divided into a control plane and a data plane. Memory variables that are used directly in control flow transfer instructions (e.g., returns, jumps, and indirect calls) are part of the control plane. The aforementioned defenses against control flow attacks involve attempting to protect the integrity of the control plane memory or checking the targets of control transfers. DOP attacks circumvent these control flow attack defenses by targeting the data plane, meaning those memory variables not directly used in control flow transfer instructions, to construct data-oriented gadgets. DOP attacks exploit non-control data variables and cannot be dealt with by control flow attack defenses since execution of data-oriented gadgets does not deviate from a legitimate control flow path Gadgets constructed using ROP, JOP, COP, COOP, and DOP have all been shown to enable Turing-complete (e.g., arbitrary) malicious computation.

There are existing ROP gadget searching tools (e.g., ROPGadget, Ropper, and ROPME) that perform static analysis on a given binary to find possible ROP gadgets. These tools facilitate writing ROP exploits, but they may also be utilized by defense mechanisms. These tools, however, perform syntactic searching and cannot return all suitable gadgets. They also suffer from the weaknesses of static analysis to utilize runtime information in the context of detecting all possible gadgets. Moreover, these tools return many irrelevant gadgets and are both inefficient and time consuming. Another gadget finding tool, Opti-ROP, performs semantic queries to find ROP gadgets. All of these tools, however, are specific to ROP gadgets and cannot detect COP, JOP, DOP, or COOP gadgets.

The control flow and DOP attacks described above exploit a program vulnerability to manipulate the code pointer and then execute a chain of gadgets that may download and run malware. A gadget may be regarded as a set of instruction sequences, where each element of the set is an atomic task (e.g., a load, add, or invocation of a system call). To defend against these attacks, it is more practical to detect the malware invasion early, in the vulnerable entry or gadget execution phase, rather than when the malware starts running.

Described herein is a machine learning (ML) model for detecting an exploit execution within a given trace of application execution. In a specific embodiment, the ML model identifies whether there is any gadget or gadget-chain execution at indirect and conditional branches. Gadget identification is thus defined as an ML classification problem where the goal is to label execution at each indirect branch as either a gadget or not. Machine learning is used to automatically generate literal patterns in order to handle situations such as operand variations in similar instructions and newer gadgets without relying on manually generated patterns or heuristics. Given an application execution trace, the basic block instruction sequences at non-deterministic (indirect and conditional) branches are reconstructed. The ML algorithms then operate on the reconstructed instruction sequences.

Figure 1:
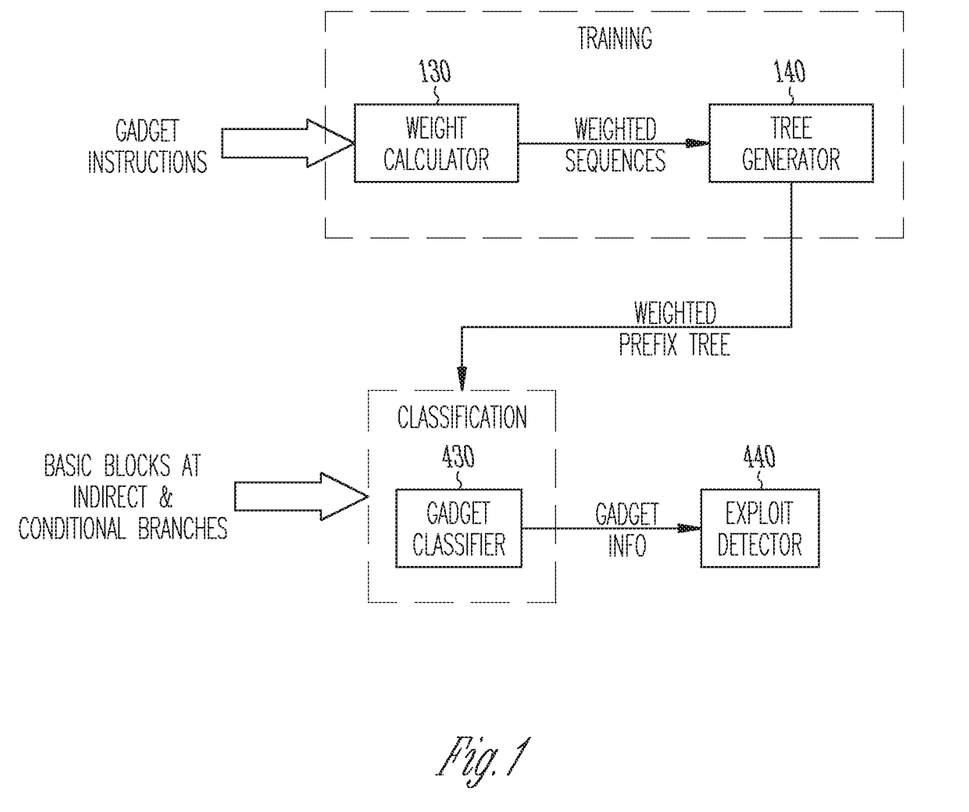
FIG. 1 illustrates a machine learning model for detecting gadgets according to some embodiments.
Figure 6:
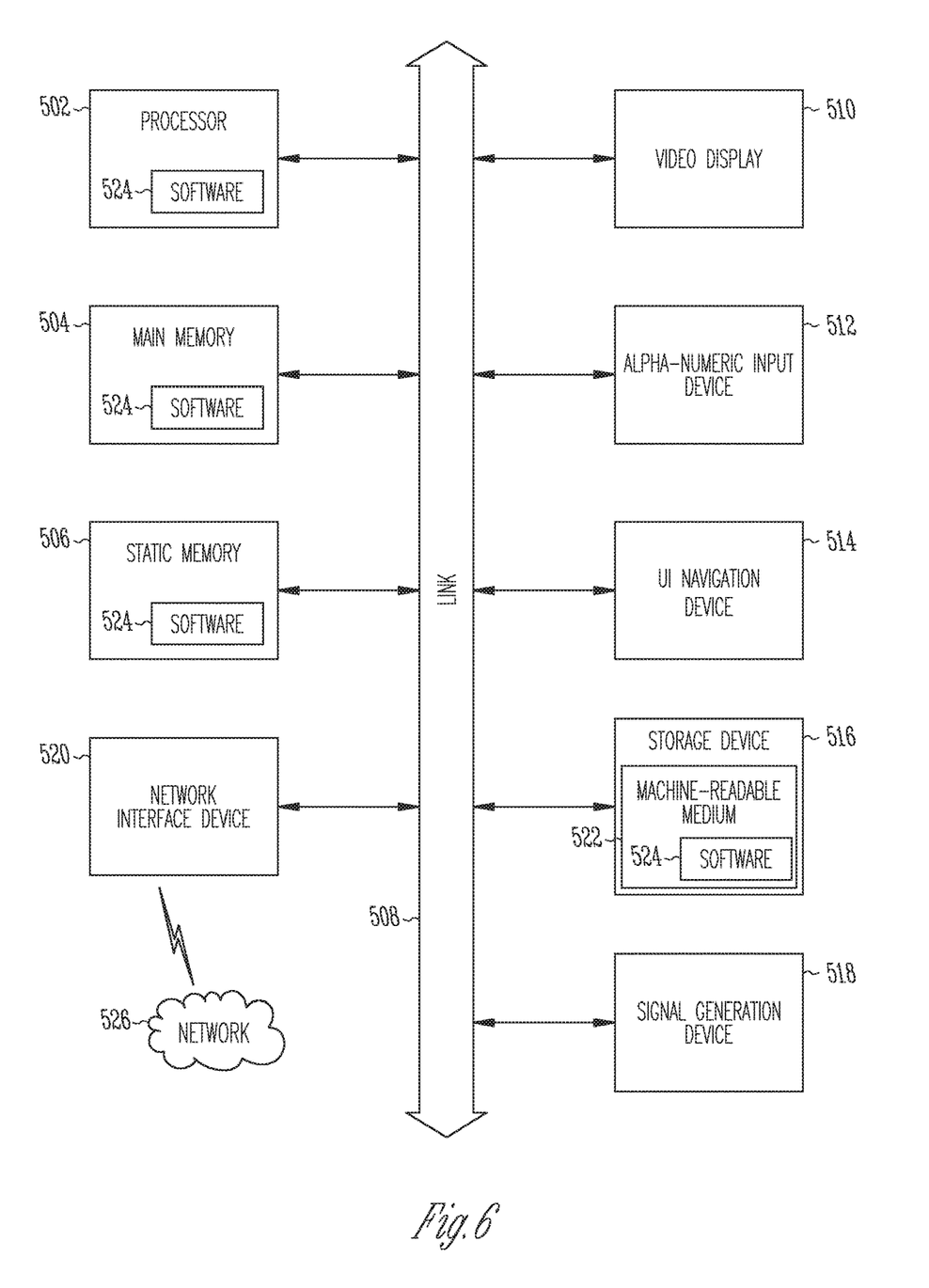
FIG. 6 is a block diagram illustrating an example machine upon which any one or more of the techniques (e.g., methodologies) discussed herein may perform, according to an example embodiment.

In an embodiment, a computer system such as described below with reference to FIG. 6 is configured to detect gadget execution using a machine learning model that creates gadget instruction patterns using supervised machine learning. FIG. 1 illustrates an example embodiment of the machine learning model. During the training phase of the model, signatures for gadgets are learned to generate a weighted prefix tree. Each node in the weighted prefix tree corresponds to either a byte or an instruction, with the path from the root node to any given node representing a possible sequence of bytes or instructions. The weights, which can be learned with a single linear pass over a data set, express the confidence that a sequence of bytes or instructions corresponds to a gadget. As shown in FIG. 1, weight calculator 130 computes weights from gadget instructions to generate weighted sequences that are fed to tree generator 140 in order to create the weighted prefix tree.

During the classification or usage phase, upon a non-deterministic (e.g., indirect or conditional) branch event, a basic block of code starting from the branch target address is extracted. The system then tries to recognize a gadget by matching the basic code block with the model. An exploit is then detected based on a detected chain of gadgets. FIG. 1 illustrates a gadget classifier 430 that generates gadget information indicating whether or not a basic code block is a gadget using the weighted prefix tree generated in the training phase. The gadget information is then passed to exploit detector 440 to determine if an exploit has been executed based upon a specified criterion such as a certain number of gadgets being consecutively executed.

A reference corpus of gadget instructions is compiled from the execution trace of available exploits or using a tool that automatically generates all the gadgets from reference binaries. A prefix tree is then generated from the reference corpus to represent all possible gadget sequences. A prefix tree, also called a trie, is a data structure enabling efficient information retrieval. In the generated prefix tree, each non-root node has an associated instruction. The sequence for a node n is represented by the elements that appear on the path from the root to n. Various types of normalization (e.g., immediate number normalization, instruction operand normalization, call and jump instruction normalization, etc.) may be performed on the instructions stored in the prefix tree. Normalization takes an instruction as input and generalizes it so that it can match against very similar, but not identical instructions. Instruction normalizations help to improve detection accuracy.

As an ML classification problem, the method for detecting gadgets comprises a training phase followed by a classification phase. In the training phase, the prefix tree containing gadgets as described above is regarded as the training set. During training, the nodes of the prefix tree are weighted in accordance with the probability that matching sequences found in a set of test binaries actually turn out to be gadgets. The set of test binaries may be selected, for example, as binaries that are known to have ROP/JOP/DOP gadgets that have been used in a reported exploit, application binaries taken from system dynamic link libraries (DLLs), and or binaries found by an ROP or other type of gadget finder tool to have exploitable ROP or other type gadgets. For each node, a weight is assigned that represents the likelihood that the sequence corresponding to the path from the root node to this node is a gadget in the training set.

Figure 2:
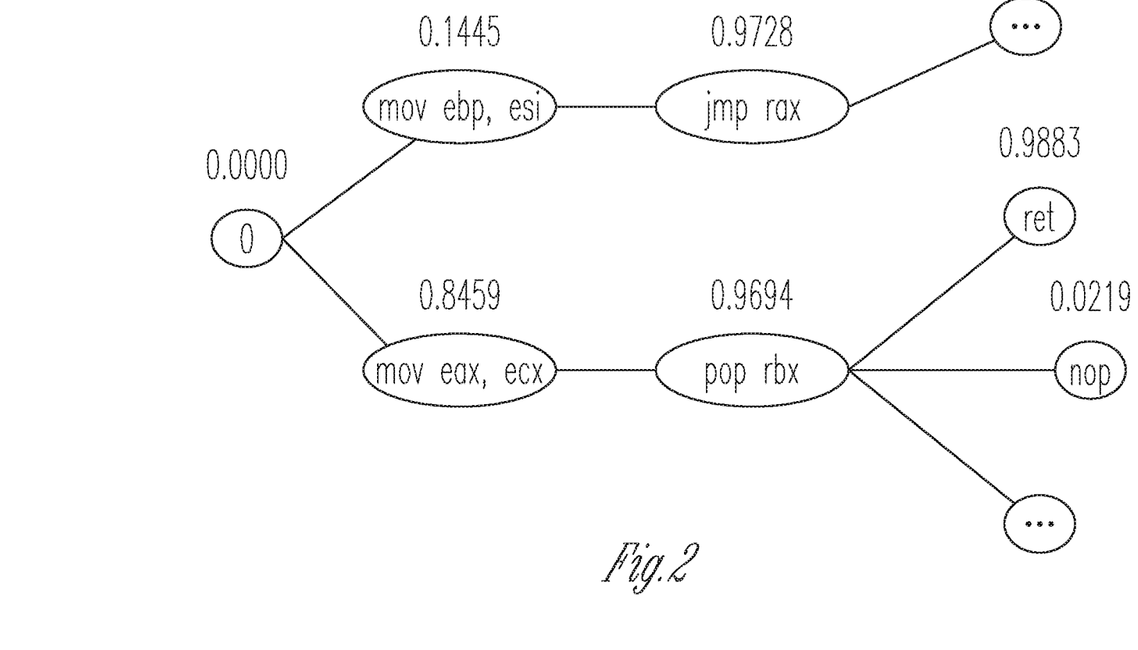
FIG. 2 illustrates a prefix tree whose node are populated by gadget instruction sequences according to some embodiments.

FIG. 2 shows an example of a prefix tree where the weight of node mov ebp, esi is assigned as 0.1445. This means that, during training, 14.45% of all sequences with prefix of mov ebp, esi were truly a gadget start, while 85.55% were not. To calculate the weight, we first count the number of occurrences T+ in which each prefix in the tree matches a true gadget with respect to the ground truth for the entire training set. Second, we lower the weight of a prefix if it occurs in a binary, but is not part of a gadget. The number of false matches T− is the number of times a prefix represented in the tree is not in a gadget in the training set. The weight for each node n is then the ratio of true positives to overall matches:

$$W_n = \frac{T_+}{T_+ + T_-}$$

In the classification phase, the weighted prefix tree is used to determine whether a given sequence of instructions corresponds to a gadget. A sequence is determined to correspond to a gadget if the corresponding terminal node in the prefix tree has a weight value larger than a specified threshold Th. In the case where the sequence exactly matches a path in the prefix tree, the terminal node is the final node in this path. If the sequence does not exactly match a path in the tree, the terminal node is the last matched node in the sequence. Once a gadget is identified, various types of analysis may be performed on sequences of gadget executions to detect exploits. An example is to set k consecutive gadget executions as a criterion for exploit detection.

In an alternative embodiment, a recurrent neural network, instead of weighted prefix tree, may be used for gadget identification. The recurrent neural network is trained to take bytes of the binary as input, and predict, for each location, whether a gadget is present at that location.

Figure 3:
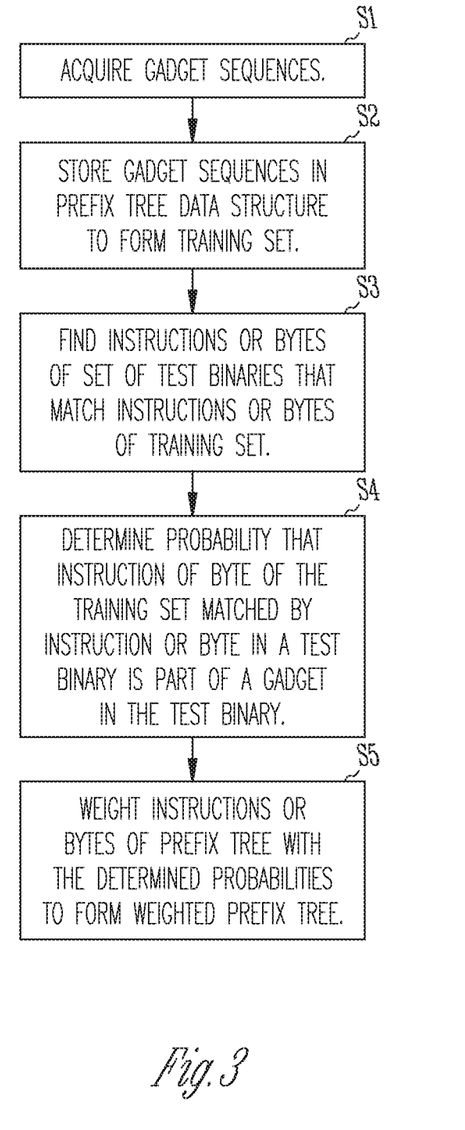
FIG. 3 illustrates the training phase of a machine learning gadget detector according to some embodiments.

FIG. 3 illustrates the training phase according to some embodiments. At stage S1, a reference corpus of gadget sequences is acquired by, for example, compiling gadget instructions from the execution trace of available exploits or using a tool that automatically generates gadgets from reference binaries. At stage S2, the gadget sequences are stored in a prefix tree data structure to form the training set. At stage S3, instructions or bytes of set of test binaries that match instructions or bytes of training set are found. At stage S4, the probability that an instruction or byte of the training set matched by instruction or byte in the test binary is part of a gadget in the test binary is determined. At stage S5, instructions or bytes of the prefix tree are weighted with the determined probabilities to form the weighted prefix tree.

Figure 4:
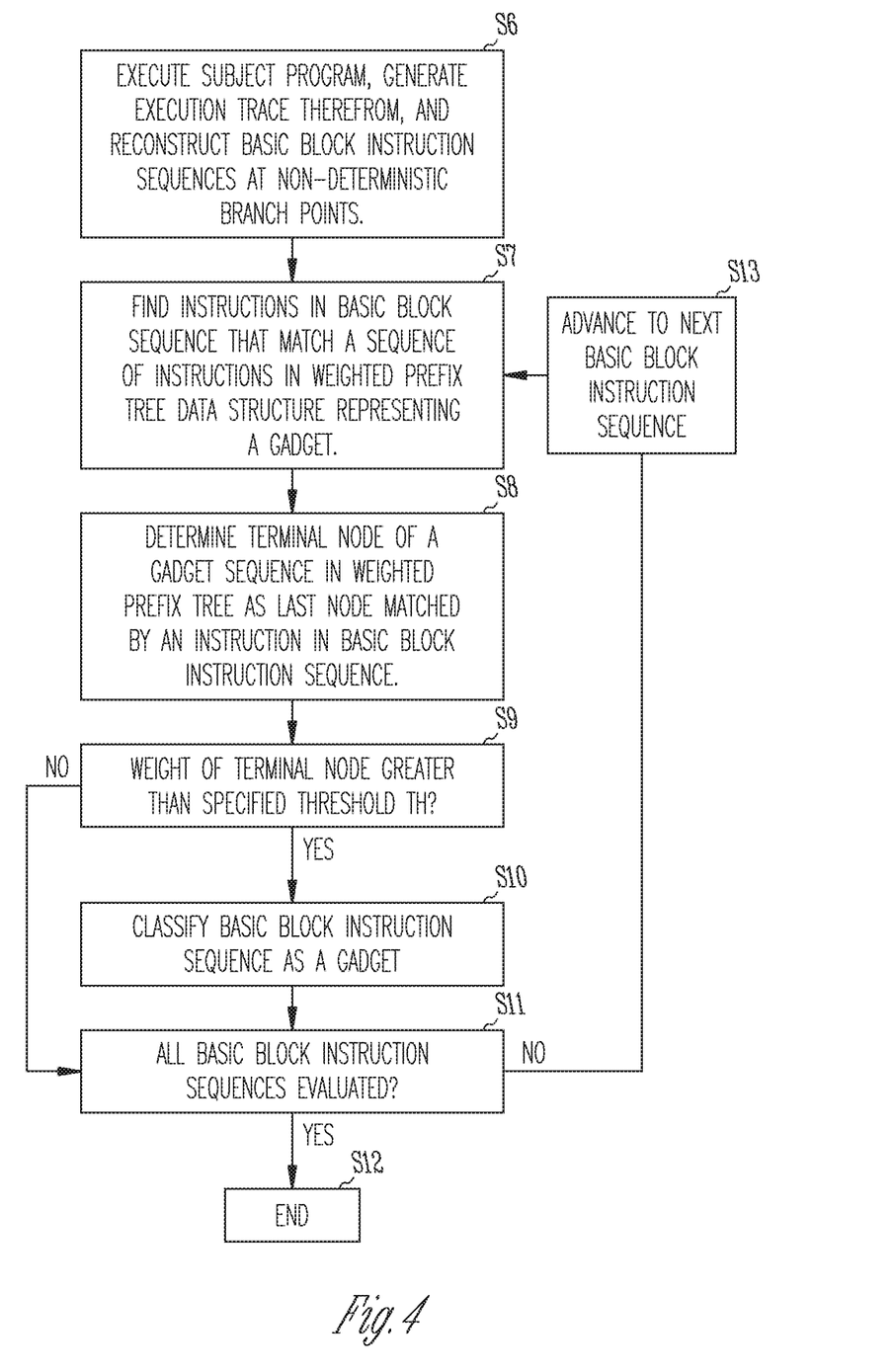
FIG. 4 illustrates the classification phase of a machine learning gadget detector according to some embodiments.

FIG. 4 illustrates the classification phase according to some embodiments. At stage S6, the subject program is executed, an execution trace is generated therefrom, and basic block instruction sequences at non-deterministic branch points are reconstructed. At stage S7, the system finds instructions in a basic block sequence that match a sequence of instructions in weighted prefix tree data structure representing a gadget. A terminal node of a gadget sequence in the weighted prefix tree is determined as the last node matched by an instruction in basic block instruction sequence at stage S8. If the weight of a terminal node is determined at stage S9 to be greater than a specified threshold Th, the basic block instruction sequence is classified as a gadget at stage S10. If not, stage S10 is skipped. If it is then determined at stage S11 that all basic block instruction sequences in the execution trace have been evaluated, the classification phase ends at stage S12. Otherwise, the system advances to the next basic block instruction sequence at stage S13 and returns to stage S7.

Figure 5:
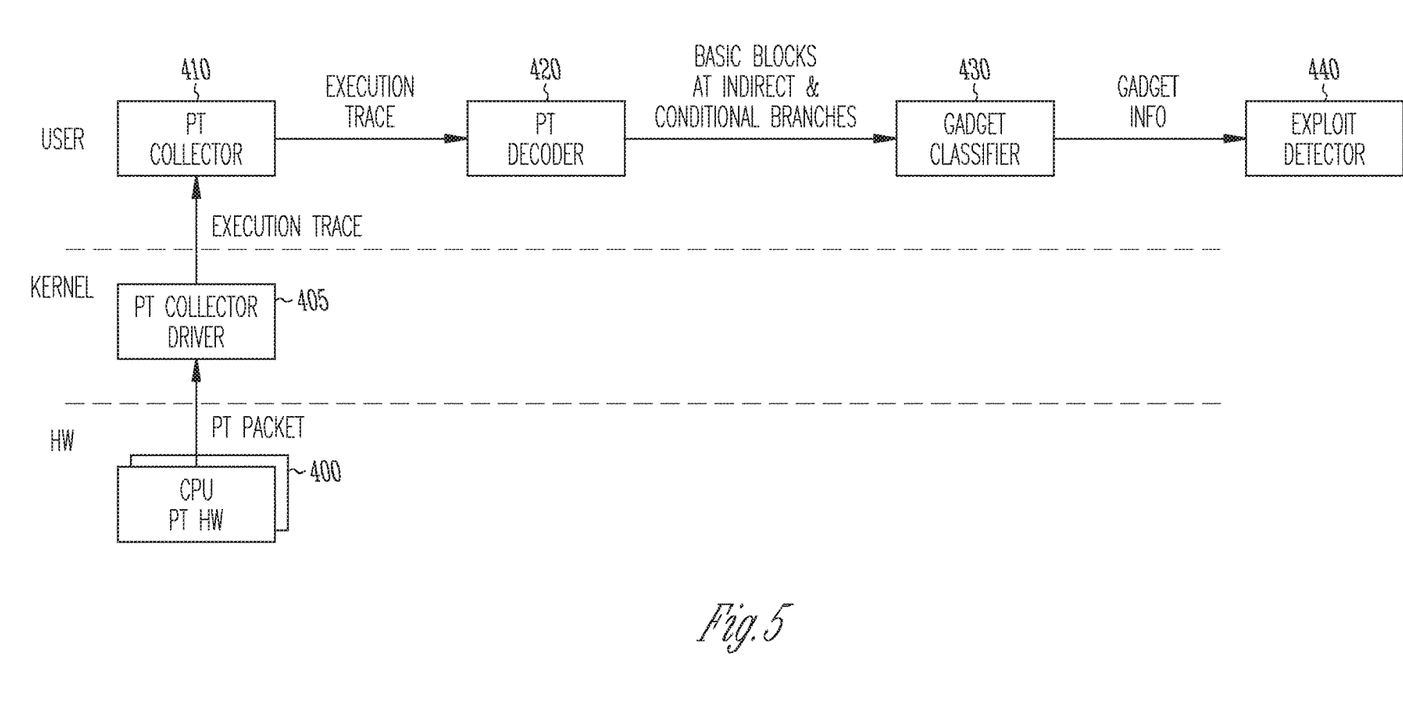
FIG. 5 illustrates the architecture of a computer system for detecting gadgets according to some embodiments.

In order to generate execution traces from a subject program, hardware-based execution traces may utilized such as provided by the Processor Trace (PT) incorporated into certain processors made by the Intel Corporation. PT captures control flow information of an application execution, including the instruction pointer and indirect branch targets, and facilitates time-series analysis and instruction-granular analysis of executions. Hardware-based traces are unforgeable and therefore provide a complete control flow history of an application execution. An example of a system architecture of an exploit detection mechanism utilizing the ML based gadget classification described above is shown in FIG. 5. The PT collector 410 is a user-space application that interacts with the PT collector driver 405 to configure and collect run-time PT data for a monitored application executed by processor 400. PT decoder 420 is a user-space application that decodes PT data and reconstructs executed instructions (i.e., basic block instruction sequences) at indirect and conditional branches. Gadget classifier 430 is a module that operates on the reconstructed instruction sequences and uses the ML algorithm described above to identify gadget executions at non-deterministic branches. Exploit detector 440 is a module that utilizes gadget information to perform various analysis (e.g., identify execution of a gadget-chain) and detect an exploit execution.

Embodiments as described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

FIG. 6 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI)

navigation device 514 (e.g., a mouse). In an embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

In Example 1, a method for operating a computer system, comprises: executing instructions of a subject program and generating an execution trace therefrom; reconstructing basic block instruction sequences at branch points of the execution trace, wherein each block sequence is a sequence of instructions executed after the branch point; comparing bytes or instructions of the basic block instruction sequence to known gadget sequences of instructions stored in nodes of a prefix tree data structure; wherein each node of the prefix tree is associated with a weight representing a probability that a sequence of instructions matching the gadget sequence up until that node is a gadget; and, determining that the basic block sequence is a gadget if the associated probability of the last node of the gadget sequence matched by the basic block instruction sequence is greater than a specified threshold.

In Example 2, the subject matter of Example 1 optionally includes further comprising weighting the nodes of the prefix tree in accordance with a determined probability that matching sequences found in a set of test binaries actually turn out to be gadgets.

In Example 3, the subject matter of any one or more of Examples 1-2 optionally includes calculating the weight $W_n$ of a node n in the prefix tree by: counting the number of occurrences T+ in which a node in the prefix tree matches a true gadget in the set of test binaries; counting the number of times T− that a node in the prefix tree occurs in the set of test binaries but is not part of a gadget; and calculating the weight $W_n$ as:

$$W_n = \frac{T_+}{T_+ + T_-}$$

In Example 4, the subject matter of any one or more of Examples 1-3 optionally includes wherein the set of test binaries is at least one of: binaries that are known to have gadgets and that have been used in a reported exploit, application binaries taken from system dynamic link libraries (DLLs), and binaries found by a gadget finder tool to have exploitable gadgets.

In Example 5, the subject matter of any one or more of Examples 1-4 optionally includes wherein the nodes of the prefix tree are normalized in order to match with similar but not identical instructions of the basic block instruction sequence.

In Example 6, the subject matter of any one or more of Examples 1-5 optionally includes determining that an exploit has been executed in the subject program if a specified number k of gadgets has been found to have been consecutively executed.

In Example 7, the subject matter of any one or more of Examples 1-6 optionally includes wherein the branch points of the subject program at which basic block instruction sequences are reconstructed are non-deterministic branch points.

In Example 8, the subject matter of any one or more of Examples 1-7 optionally includes generating the execution trace with a processor incorporating processor trace (PT) functionality.

In Example 9, a computer system for detecting exploits comprises: a processor incorporating processor trace (PT) functionality for generating an execution trace of a subject program; a PT collector that interacts with a PT collector driver to collect execution traces of the subject program; a PT decoder for reconstructing basic block instruction sequences at branch points of the subject program; a gadget classifier for detecting gadgets in the subject program by: comparing bytes or instructions of the basic block instruction sequence to one or more known gadget sequences of instructions stored in nodes of a prefix tree data structure; wherein each node of the prefix tree is associated with a weight representing a probability that a sequence of instructions matching the gadget sequence up until that node is a gadget; and, determining that the basic block sequence is a gadget if the associated probability of the last node of the gadget sequence matched by the basic block instruction sequence is greater than a specified threshold.

In Example 10, the subject matter of Example 9 optionally includes wherein the nodes of the prefix tree are weighted in accordance with a determined probability that matching sequences found in a set of test binaries actually turn out to be gadgets.

In Example 11, the subject matter of any one or more of Examples 9-10 optionally includes wherein the weight $W_n$ of a node n in the prefix tree is calculated by: counting the number of occurrences T+ in which a node in the prefix tree matches a true gadget in the set of test binaries; counting the number of times T− that a node in the prefix tree occurs in the set of test binaries but is not part of a gadget; and calculating the weight $W_n$ as:

$$W_n = \frac{T_+}{T_+ + T_-}$$

In Example 12, the subject matter of any one or more of Examples 9-11 optionally includes wherein the set of test binaries is selected from one or more of: binaries that are known to have gadgets and that have been used in a reported exploit, application binaries taken from system dynamic link libraries (DLLs), and binaries found by a gadget finder tool to have exploitable gadgets.

In Example 13, the subject matter of any one or more of Examples 9-12 optionally includes wherein the nodes of the prefix tree are normalized in order to match with similar but not identical instructions of the basic block instruction sequence.

In Example 14, the subject matter of any one or more of Examples 9-13 optionally includes an exploit detector for determining that an exploit has been executed in the subject program if a specified number k of gadgets has been found to have been consecutively executed.

In Example 15, the subject matter of any one or more of Examples 9-14 optionally includes wherein the branch points of the subject program at which basic block instruction sequences are reconstructed are non-deterministic branch points.

Example 16 is at least one computer-readable medium comprising instructions to cause a computer system, upon execution of the instructions by a processor of the computing system, to: execute instructions of a subject program and generating an execution trace therefrom; reconstruct basic block instruction sequences at branch points of the execution trace, wherein each block sequence is a sequence of instructions executed after the branch point; compare bytes or instructions of the basic block instruction sequence to known gadget sequences of instructions stored in nodes of a prefix tree data structure; wherein each node of the prefix tree is associated with a weight representing a probability that a sequence of instructions matching the gadget sequence up until that node is a gadget; and, determine that the basic block sequence is a gadget if the associated probability of the last node of the gadget sequence matched by the basic block instruction sequence is greater than a specified threshold.

In Example 17, the subject matter of Example 16 optionally includes instructions to weight the nodes of the prefix tree in accordance with a determined probability that matching sequences found in a set of test binaries actually turn out to be gadgets.

In Example 18, the subject matter of any one or more of Examples 16-17 optionally includes instructions to calculate the weight $W_n$ of a node n in the prefix tree by: counting the number of occurrences T+ in which a node in the prefix tree matches a true gadget in the set of test binaries; counting the number of times T− that a node in the prefix tree occurs in the set of test binaries but is not part of a gadget; and, calculating the weight $W_n$ as:

$$W_n = \frac{T_+}{T_+ + T_-}$$

In Example 19, the subject matter of any one or more of Examples 16-18 optionally includes instructions to normalize the nodes of the prefix tree in order to match with similar but not identical instructions of the basic block instruction sequence.

In Example 20, the subject matter of any one or more of Examples 16-19 optionally includes instructions to determine that an exploit has been executed in the subject program if a specified number k of gadgets has been found to have been consecutively executed.

In Example 21, the subject matter of any one or more of Examples 16-120 optionally include instructions wherein the branch points of the subject program at which basic block instruction sequences are reconstructed are non-deterministic branchpoints.

In Example 22, a computer system, comprises: means for executing instructions of a subject program and generating an execution trace therefrom; means for reconstructing basic block instruction sequences at branch points of the execution trace, wherein each block sequence is a sequence of instructions executed after the branch point; means for comparing bytes or instructions of the basic block instruction sequence to known gadget sequences of instructions stored in nodes of a prefix tree data structure; wherein each node of the prefix tree is associated with a weight representing a probability that a sequence of instructions matching the gadget sequence up until that node is a gadget; and, means for determining that the basic block sequence is a gadget if the associated probability of the last node of the gadget sequence matched by the basic block instruction sequence is greater than a specified threshold.

In Example 23, the subject matter of Example 22 or any of the Examples herein optionally includes means for weighting the nodes of the prefix tree in accordance with a determined probability that matching sequences found in a set of test binaries actually turn out to be gadgets.

In Example 24, the subject matter of Example 23 or any of the Examples herein optionally includes means for calculating the weight $W_n$ of a node n in the prefix tree by: counting the number of occurrences T+ in which a node in the prefix tree matches a true gadget in the set of test binaries; counting the number of times T− that a node in the prefix tree occurs in the set of test binaries but is not part of a gadget; and, calculating the weight $W_n$ as:

$$W_n = \frac{T_+}{T_+ + T_-}$$

In Example 25, the subject matter of Example 22 or any of the Examples herein optionally includes wherein the set of test binaries is at least one of: binaries that are known to have gadgets and that have been used in a reported exploit, application binaries taken from system dynamic link libraries (DLLs), and binaries found by a gadget finder tool to have exploitable gadgets.

In Example 26, the subject matter of Example 22 or any of the Examples herein optionally includes wherein the nodes of the prefix tree are normalized in order to match with similar but not identical instructions of the basic block instruction sequence.

In Example 27, the subject matter of Example 22 or any of the Examples herein optionally includes means for determining that an exploit has been executed in the subject program if a specified number k of gadgets has been found to have been consecutively executed.

In Example 28, the subject matter of Example 22 or any of the Examples herein optionally includes wherein the branch points of the subject program at which basic block instruction sequences are reconstructed are non-deterministic branch points.

In Example 29, the subject matter of Example 22 or any of the Examples herein optionally includes means for generating the execution trace with a processor incorporating processor trace (PT) functionality.

Example 30 is a computer system comprising means for performing any one or more of the methods recited in Examples 1-8.

Example 31 is at least one machine-readable medium including instructions, which when executed by a machine, cause the machine to perform operations of any of the operations of Examples 1-20.

Example 32 is an apparatus comprising means for performing any of the operations of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for operating a computer system, comprising:
   executing instructions of a subject program and generating an execution trace therefrom;
   reconstructing basic block instruction sequences at branch points of the execution trace, wherein each block sequence is a sequence of instructions executed after the branch point;
   comparing bytes or instructions of the basic block instruction sequence to known gadget sequences of instructions stored in nodes of a prefix tree data structure;
   wherein each node of the prefix tree is associated with a weight representing a probability that a sequence of instructions matching the gadget sequence up until that node is a gadget; and,
   determining that the basic block sequence is a gadget if the associated probability of the last node of the gadget sequence matched by the basic block instruction sequence is greater than a specified threshold.

2. The method of claim 1 further comprising weighting the nodes of the prefix tree in accordance with a determined probability that matching sequences found in a set of test binaries actually turn out to be gadgets.

3. The method of claim 2 further comprising calculating the weight $W_n$ of a node n in the prefix tree by:
   counting the number of occurrences T+ in which a node in the prefix tree matches a true gadget in the set of test binaries;
   counting the number of times T− that a node in the prefix tree occurs in the set of test binaries but is not part of a gadget; and
   calculating the weight $W_n$ as:

$$W_n = \frac{T_+}{T_+ + T_-}.$$

4. The method of claim 2 wherein the set of test binaries is at least one of: binaries that are known to have gadgets and that have been used in a reported exploit, application binaries taken from system dynamic link libraries (DLLs), and binaries found by a gadget finder tool to have exploitable gadgets.

5. The method of claim 1 wherein the nodes of the prefix tree are normalized in order to match with similar but not identical instructions of the basic block instruction sequence.

6. The method of claim 1 further comprising determining that an exploit has been executed in the subject program if a specified number k of gadgets has been found to have been consecutively executed.

7. The method of claim 1 wherein the branch points of the subject program at which basic block instruction sequences are reconstructed are non-deterministic branch points.

8. The method of claim 1 further comprising generating the execution trace with a processor incorporating processor trace (PT) functionality.

9. A computer system for detecting exploits comprising:
a processor incorporating processor trace (PT) functionality for generating an execution trace of a subject program;
a PT collector that interacts with a PT collector driver to collect execution traces of the subject program;
a PT decoder for reconstructing basic block instruction sequences at branch points of the subject program;
a gadget classifier for detecting gadgets in the subject program by:
comparing bytes or instructions of the basic block instruction sequence to one or more known gadget sequences of instructions stored in nodes of a prefix tree data structure;
wherein each node of the prefix tree is associated with a weight representing a probability that a sequence of instructions matching the gadget sequence up until that node is a gadget; and,
determining that the basic block sequence is a gadget if the associated probability of the last node of the gadget sequence matched by the basic block instruction sequence is greater than a specified threshold.

10. The computer system of claim 9 wherein the nodes of the prefix tree are weighted in accordance with a determined probability that matching sequences found in a set of test binaries actually turn out to be gadgets.

11. The computer system of claim 10 wherein the weight $W_n$ of a node n in the prefix tree is calculated by:
counting the number of occurrences T+ in which a node in the prefix tree matches a true gadget in the set of test binaries;
counting the number of times T− that a node in the prefix tree occurs in the set of test binaries but is not part of a gadget; and calculating the weight $W_n$ as:

$$W_n = \frac{T_+}{T_+ + T_-}.$$

12. The computer system of claim 10 wherein the set of test binaries is selected from one or more of: binaries that are known to have gadgets and that have been used in a reported exploit, application binaries taken from system dynamic link libraries (DLLs); and binaries found by a gadget finder tool to have exploitable gadgets.

13. The computer system of claim 9 wherein the nodes of the prefix tree are normalized in order to match with similar but not identical instructions of the basic block instruction sequence.

14. The computer system of claim 9 further comprising an exploit detector for determining that an exploit has been executed in the subject program if a specified number k of gadgets has been found to have been consecutively executed.

15. The computer system of claim 9 wherein the branch points of the subject program at which basic block instruction sequences are reconstructed are non-deterministic branch points.

16. At least one computer-readable medium comprising instructions to cause a computer system, upon execution of the instructions by a processor of the computing system, to:
execute instructions of a subject program and generating an execution trace therefrom;
reconstruct basic block instruction sequences at branch points of the execution trace, wherein each block sequence is a sequence of instructions executed after the branch point;
compare bytes or instructions of the basic block instruction sequence to known gadget sequences of instructions stored in nodes of a prefix tree data structure;
wherein each node of the prefix tree is associated with a weight representing a probability, that a sequence of instructions matching the gadget sequence up until that node is a gadget; and,
determine that the basic block sequence is a gadget if the associated probability of the last node of the gadget sequence matched by the basic block instruction sequence is greater than a specified threshold.

17. The medium of claim 16 further comprising instructions to weight the nodes of the prefix tree in accordance with a determined probability that matching sequences found in a set of test binaries actually turn out to be gadgets.

18. The medium of claim 17 further comprising instructions to calculate the weight $W_n$ of a node n in the prefix tree by:
counting the number of occurrences T+ in which a node in the prefix tree matches a true gadget in the set of test binaries;
counting the number of times T− that a node in the prefix tree occurs in the set of test binaries but is not part of a gadget; and
calculating the weight $W_n$ as:

$$W_n = \frac{T_+}{T_+ + T_-}.$$

19. The medium of claim 16 further comprising instructions to normalize the nodes of the prefix tree in order to match with similar but not identical instructions of the basic block instruction sequence.

20. The medium of claim 16 further comprising instructions to determine that an exploit has been executed in the subject program if a specified number k of gadgets has been found to have been consecutively executed.

* * * * *